(12) United States Patent
Vyas et al.

(10) Patent No.: US 10,650,207 B2
(45) Date of Patent: *May 12, 2020

(54) MACHINE READABLE CODE WITH PORTION ANALYSIS

(71) Applicant: Visa International Service Association, San Francisco, CA (US)

(72) Inventors: Surendra Vyas, Bangalore (IN); Som Madhab Bhattacharya, Lucknow (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,617

(22) Filed: Jul. 26, 2018

(65) Prior Publication Data

US 2018/0336385 A1 Nov. 22, 2018

Related U.S. Application Data

(63) Continuation of application No. 15/459,550, filed on Mar. 15, 2017, now Pat. No. 10,078,773.

(51) Int. Cl.
*G06K 5/00* (2006.01)
*G06K 7/14* (2006.01)
(Continued)

(52) U.S. Cl.
CPC ......... *G06K 7/1417* (2013.01); *G06K 7/1491* (2013.01); *G06K 19/06037* (2013.01); *G06Q 20/00* (2013.01); *G06K 17/0022* (2013.01)

(58) Field of Classification Search
CPC ............... G06Q 20/32; G06Q 20/3223; G06Q 20/3276; G06Q 20/10; G06Q 20/40;
(Continued)

(56) References Cited

U.S. PATENT DOCUMENTS

| 5,673,320 A | 9/1997 | Ray |
| 7,493,284 B2 | 2/2009 | Celi, Jr. |

(Continued)

FOREIGN PATENT DOCUMENTS

| JP | 2009-183390 A2 | 8/2009 |
| WO | 2016/022597 A1 | 2/2016 |

OTHER PUBLICATIONS

Russell, "Tile Puzzles: Gamification for QR Code Marketing Campaigns?" https://barcode.com/20110322510/tile-puzzles-gamification-for-qr-code-marketing-campaigns.html, Visited website on Mar. 14, 2017, 5 pages.

(Continued)

*Primary Examiner* — Thien M Le
(74) *Attorney, Agent, or Firm* — Kilpatrick Townsend & Stockton LLP (57) ABSTRACT

Embodiments are directed to methods and systems to increase flow and throughput of particular data through the use of a machine readable code with portion analysis. The machine readable code may be generated by a transaction processing network and correspond with one or more resource provider computers. When data is received by the transaction processing network that corresponds with one of the resource provider computers, a portion of the machine readable code that is proportional to a size or measurement of the data may be provided in exchange for the data. The recipient of the portion of the code and, once the recipient collects a predetermined number of machine readable code portions to complete the machine readable code, the complete machine readable code may be scanned and transmitted back to the transaction processing network to be exchanged for additional information or to initiate further processing.

20 Claims, 5 Drawing Sheets

(51) Int. Cl.
*G06K 19/06* (2006.01)
*G06Q 20/00* (2012.01)
*G06K 17/00* (2006.01)

(58) Field of Classification Search
CPC ............. G06Q 20/40145; G06Q 40/12; G06Q 20/042; G06Q 30/04; H04W 12/06; G06F 21/36; G06K 9/00013
See application file for complete search history.

(56) References Cited

U.S. PATENT DOCUMENTS

| | | | |
|---|---|---|---|
| 8,924,712 B2* | 12/2014 | Varadarajan | G06Q 20/3276 713/155 |
| 9,640,040 B2* | 5/2017 | Irudayam | G07F 19/202 |
| 10,078,773 B1 | 9/2018 | Vyas et al. | |
| 2006/0239968 A1 | 10/2006 | Arap et al. | |
| 2009/0192904 A1 | 7/2009 | Patterson et al. | |
| 2013/0031623 A1* | 1/2013 | Sanders | G06F 21/34 726/19 |
| 2013/0179250 A1 | 7/2013 | Nguyen | |
| 2013/0325661 A1* | 12/2013 | Collins, Jr. | G06Q 20/042 705/26.41 |
| 2014/0040617 A1* | 2/2014 | Fernandez de Torres | H04L 63/08 713/168 |
| 2014/0115708 A1* | 4/2014 | Terwilliger | G06F 21/36 726/26 |
| 2014/0162598 A1 | 6/2014 | Villa-Real | |
| 2014/0164243 A1 | 6/2014 | Aabye et al. | |
| 2014/0263623 A1 | 9/2014 | Robison et al. | |
| 2014/0344082 A1* | 11/2014 | Soundararajan | G06Q 20/40 705/16 |
| 2014/0344151 A1* | 11/2014 | Soundararajan | G06Q 20/322 705/44 |
| 2015/0095222 A1 | 4/2015 | Narendra | |
| 2015/0161612 A1 | 6/2015 | Parento et al. | |
| 2015/0379552 A1 | 12/2015 | Kent | |
| 2016/0117678 A1 | 4/2016 | Weidenmiller | |
| 2016/0314462 A1 | 10/2016 | Hong et al. | |
| 2016/0321672 A1 | 11/2016 | Sadacharam | |
| 2017/0124553 A1 | 5/2017 | Sadacharam | |
| 2017/0372308 A1* | 12/2017 | Metnick | G06Q 20/10 |

OTHER PUBLICATIONS

Shaah "Is it possible to scan more than 1 QR code at a time?" https://www.quora.com/Is-it-possible-to-scan-more-than-1-QR-code-at-a-time, Visited website on Mar. 14, 2017, 3 pages.
International Search Report and Written Opinion for PCT/US2018/014103 dated Apr. 30, 2018, 10 pages.
Non-Final Office Action for U.S. Appl. No. 15/459,550 dated Nov. 16, 2017, 18 pages.
Notice of Allowance for U.S. Appl. No. 15/459,550 dated May 8, 2018, 10 pages.
Invitation to Pay Additional Fees and, Where Applicable, Protest Fee for PCT/US2018/014103 dated Sep. 13, 2018, 2 pages.
EP18767678.8, "Extended European Search Report", dated Jan. 15, 2020, 8 pages.

* cited by examiner

MACHINE READABLE CODE WITH PORTION ANALYSIS

CROSS REFERENCE TO RELATED APPLICATIONS

This application is a continuation of U.S. patent application Ser. No. 15/459,550, filed on Mar. 15, 2017, which is herein incorporated by reference in its entirety.

BACKGROUND

Systems that facilitate data processing and analysis perform extensive computing functions. When additional data processing and analysis is added to these systems, all processing may be delayed, causing slower processing speeds of basic data processing and analysis tasks. As such, the systems would benefit from targeted processing to either minimize data that is pending and available to process or maximize the organization or flow of the data to create more efficient processing and analysis.

Embodiments of the present disclosure address these and other technical problems, individually and collectively.

BRIEF SUMMARY

Embodiments of the disclosure solve these and other technical problems by increasing the flow and throughput of particular data through the use of a machine readable code with portion analysis. For example, a machine readable code may be generated and portioned in response to receiving particular data. This encourages the generation of particular data. When the production of additional data are encouraged and/or increased, a portion of a machine readable code may be provided to a recipient. The recipient of the machine readable code portion may be motivated to provide additional data to receive additional portions of the machine readable code, thus increasing the likelihood of receiving the particular data from the recipient. The recipient may collect the machine readable code portions to generate the complete machine readable code. When a complete machine readable code is received, the recipient may provide the complete machine readable code to a server computer to receive additional information associated with the complete machine readable code.

One embodiment of the invention may be directed to a method comprising receiving, by a server computer, an authorization request message comprising an account identifier from an access device in a transaction. The account identifier may be associated with a user. The method also comprises determining, by the server computer, an authorizing computer from the account identifier in the authorization request message, and forwarding, by the server computer, the authorization request message to the authorizing computer. The authorizing computer can evaluate the authorization request message and can generate an authorization response message indicating approval or denial of the transaction. The server computer then receives the authorization response message, determines a machine readable code portion of a machine readable code based upon the transaction, and then transmits representing the machine readable code portion to a communication device. The communication device thereafter displays the machine readable code portion.

Other embodiments of the invention can be directed to server computers configured to perform the above-described methods.

These and other embodiments of the invention are described in further detail below.

DETAILED DESCRIPTION

Embodiments of the disclosure are directed to methods and systems that allow for increasing the flow and throughput of particular data through the use of a machine readable code with portion analysis. The machine readable code may be generated by a transaction processing network in association with one or more resource provider computers. The complete machine readable code may be stored with the transaction processing network. When data is received by the transaction processing network that corresponds with one of the resource provider computers, a portion of the machine readable code may be provided in exchange for the data. A recipient (i.e., a user) of the portion of the machine readable code may collect one or more portions of the machine readable code at device operated by the recipient. Once the recipient collects a required number of machine readable code portions to complete the machine readable code, the complete machine readable code may be scanned and transmitted back to the transaction processing network to be exchanged for additional information or to be additionally processed.

In some examples, a size or scaling factor of the machine readable code may be proportional to the data received. As a sample illustration, a complete machine readable code may correspond with an amount of one hundred. A computing device may provide first data that corresponds with an amount of fifty or half of the total amount of one hundred. In response, the transaction processing network may generate a machine readable code portion of half of the total machine readable code (i.e., in terms of spatial area of the complete machine readable code) and transmit that half portion of the machine readable code to the computing device. The computing device may store the portion of the machine readable code. The computing device may provide second data that corresponds with an amount of thirty. In response, the transaction processing network may generate a second machine readable code portion that is thirty percent of the total machine readable code and transmit that portion of the machine readable code to the computing device, which also stores this portion. The second machine readable code portion may be exclusive of the first machine readable code portion. The computing device may now store eighty percent of the complete machine readable code. Then, third data may be received that corresponds with at least an amount of twenty. In response, the transaction processing network may generate a machine readable code portion of twenty percent of the total machine readable code and transmit that portion of the machine readable code to the computing device. The third machine readable code portion can be exclusive of the first and second machine readable code portions. After the first, second, and third machine readable code portions are received at the computing device, the complete machine readable code may be assembled by the computing device.

After the computing device has obtained the complete machine readable code, the complete machine readable code may be displayed by the computing device and scanned by an external device such as an access device. The access device may then further process the complete machine readable code as described in further detail below. Note that an incomplete machine readable code that is scanned by the access device may result in an error message since complete information may not be present with an incomplete machine readable code.

In some examples, the machine readable code or a portion of the machine readable code may be associated with more than one resource provider computer. For example, a generic machine readable code or a generic machine readable code portion may have been created by or at the instruction of two or more resource providers (e.g., two or more merchants). Such resource providers may have agreed to collaborate in a manner that allows a user redeem or use the generic machine readable code or generic machine readable code portion at two or more resource providers instead of just one resource provider. Also, in some embodiments, a generic code portion may have been obtained based upon an interaction with two or more resource providers, rather than just one resource provider. For example, a computing device or a transaction processing computer may receive first data from a first resource provider computer and receive second data from a second resource provider computer. The first data and the second data may cause the computing device or a transaction processing computer to generate a generic machine readable code portion. This generic machine readable code portion could be received by the computing device and combined with other generic or non-generic machine readable code portions to form a complete machine readable code. In embodiments of the disclosure, when the complete machine readable code is received by the computing device, the computing device may provide the complete machine readable code to an external device for decoding and/or further processing.

In some embodiments, the machine readable codes or the machine readable code portions may be associated with a transaction process. For example, data from a resource provider computer may correspond with a transaction between the user and a resource provider operating the resource provider computer. The data from the resource provider may comprise an account identifier, a total amount of the transaction, and/or a resource provider identifier. This data may be used to generate a machine readable code portion. The size of the machine readable code portion may depend upon a number of factors including the transaction amount, the resource provider identifier, etc.

Embodiments of the invention solve several technical problems. For example, using embodiments of the invention, a user operating a computing device can receive a number of machine readable code portions before being able to receive or construct a complete machine readable code. Certain behaviors and/or activities can be induced by the user's desire to obtain the complete machine readable code. In a system environment, this can encourage the efficient flow of information in a specified manner in a distributed computing system.

Prior to discussing specific embodiments of the invention, some descriptions of some terms may be useful.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "access device" may be any suitable device that can provide access to another device. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites or web servers, and the like. An access device may use any suitable contact or contactless, wired or wireless mode of operation to send or receive data from, or associated with, a communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a computing device.

An "authorization request message" may be an electronic message that is sent to request authorization for a transaction. The authorization request message can be sent to a transaction processing network and/or an authorizing computer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account (e.g., an account identifier, a user name, etc.). An authorization request message may also comprise additional data elements such as one or more of a service code, an expiration date, etc. An authorization request message may also comprise transaction information, such as any information associated with a current transaction, such as the transaction amount, resource provider identifier, resource provider location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an authorizing computer or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing computer returns in response to an authorization request message in an electronic message (either directly or through the transaction processing network) to the resource provider computer that indicates approval of the transaction. The code may serve as proof of authorization. As noted above, in some embodiments, a transaction processing network may generate or forward the authorization response message to the resource provider computer.

A "computing device" may be any suitable device that includes one or more electronic components and that can perform computations. For example, a computing device may have at least one processor coupled to a memory that stores instructions or code for execution by the processor. Examples of computing devices may include portable communication devices such as mobile phones, tablet computers, laptops, netbooks, ultrabooks, etc. A computing device may be in the form of a mobile device such as a mobile phone (e.g., smart phone, cellular phone, etc.), tablets, portable media player, personal digital assistant devices (PDAs), wearable device (e.g., watch, health monitoring device such as a fitness band, etc.), electronic reader device, etc., or in the form of a card (e.g., smart card) or a fob, etc. A computing device may have the ability to communicate with remotely located computers via a data network. A computing device can be configured to transmit and receive data or communications to and from other devices.

An "account identifier" may include an original account identifier associated with an account. For example, a real account identifier may be a primary account number (PAN) issued by an authorizing computer for an account (e.g., credit card, debit card, etc.). For instance, in some embodiments, an account identifier may include a sixteen digit numerical value such as "4147 0900 0000 1234." The first six digits of the account identifier (e.g., "414709"), may represent an authorizing computer identifier (BIN) that may identify the authorizing computer associated with the account identifier (e.g., the authorizing computer that issued the identifier and/or maintains the account, etc.).

A "machine readable code" may include any suitable code that is readable by a machine, such as a computer. In some embodiments, the machine readable code may include one-dimensional or two-dimensional bar codes (e.g., a QR Code®) to store information about a product or service, or an identifier that corresponds with additional information in a data store. The identifier may include a combination of alphabetic and numeric characters (e.g., a code version number, etc.). In some embodiments, the identifier may be encrypted using an encryption algorithm and a key for data confidentiality. Some non-limiting examples of two dimensional machine readable code include DataMatrix, Maxicode, and QR Code®. Machine readable codes may also come in different shapes or sizes (e.g., rectangular, square, circular, black and white, multi-color, etc.).

A "machine readable code portion" may comprise less than a complete machine readable code. If a complete machine readable code is in the form of a two-dimensional barcode, then a portion of the two-dimensional barcode may be some spatial fraction of the two-dimensional barcode.

In some examples, the machine readable code portion may be associated with a portion location identifier that defines a location or relative position of the machine readable code portion within a complete machine readable code (e.g., upper left corner of a square representing the machine readable code, the center of the code, x-y coordinates that define the boundaries of the code along an axis, etc.). The portion location identifier may also be present in a second machine readable code.

A "scanning device" may include a device that can scan an object such as a machine readable code. In some embodiments, a scanning device may be a camera.

Figure 1:
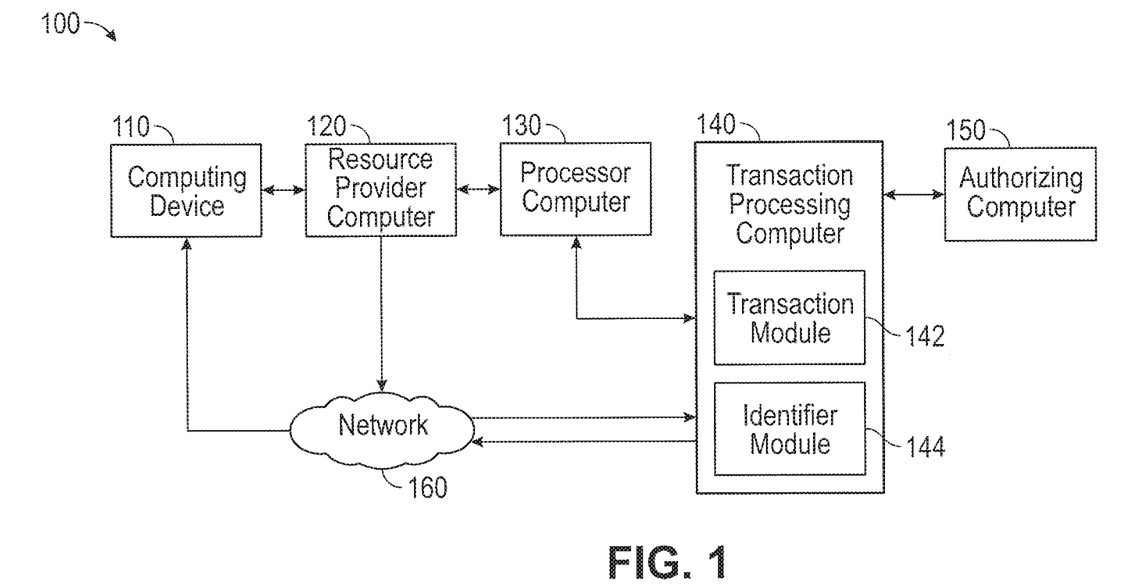
FIG. 1 illustrates a system according to an embodiment of the invention.

FIG. 1 illustrates a system 100 according to an embodiment of the invention. System 100 may include a computing device 110 operated by a user, a resource provider computer 120 operated by a resource provider, a processor computer 130, a transaction processing computer 140, and an authorizing computer 150, all in operative communication with each other. The transaction processing computer 140 may comprise a transaction module 142 and an identifier module 144. These modules may be present on a non-transitory computer readable medium (not shown) and may be executable by a data processor (not shown). The devices and computers in the system 100 may communicate through a data network 160, as well as other data networks.

The authorizing computer 150 can be operated by an entity (e.g., an issuer) that maintains an account for a user that is associated with a computing device.

The processor computer 130 may be operated by an entity (e.g., an acquirer) that has a relationship with the resource provider 120.

The transaction processing computer 140 may form part of a transaction processing network, and can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Figure 2:
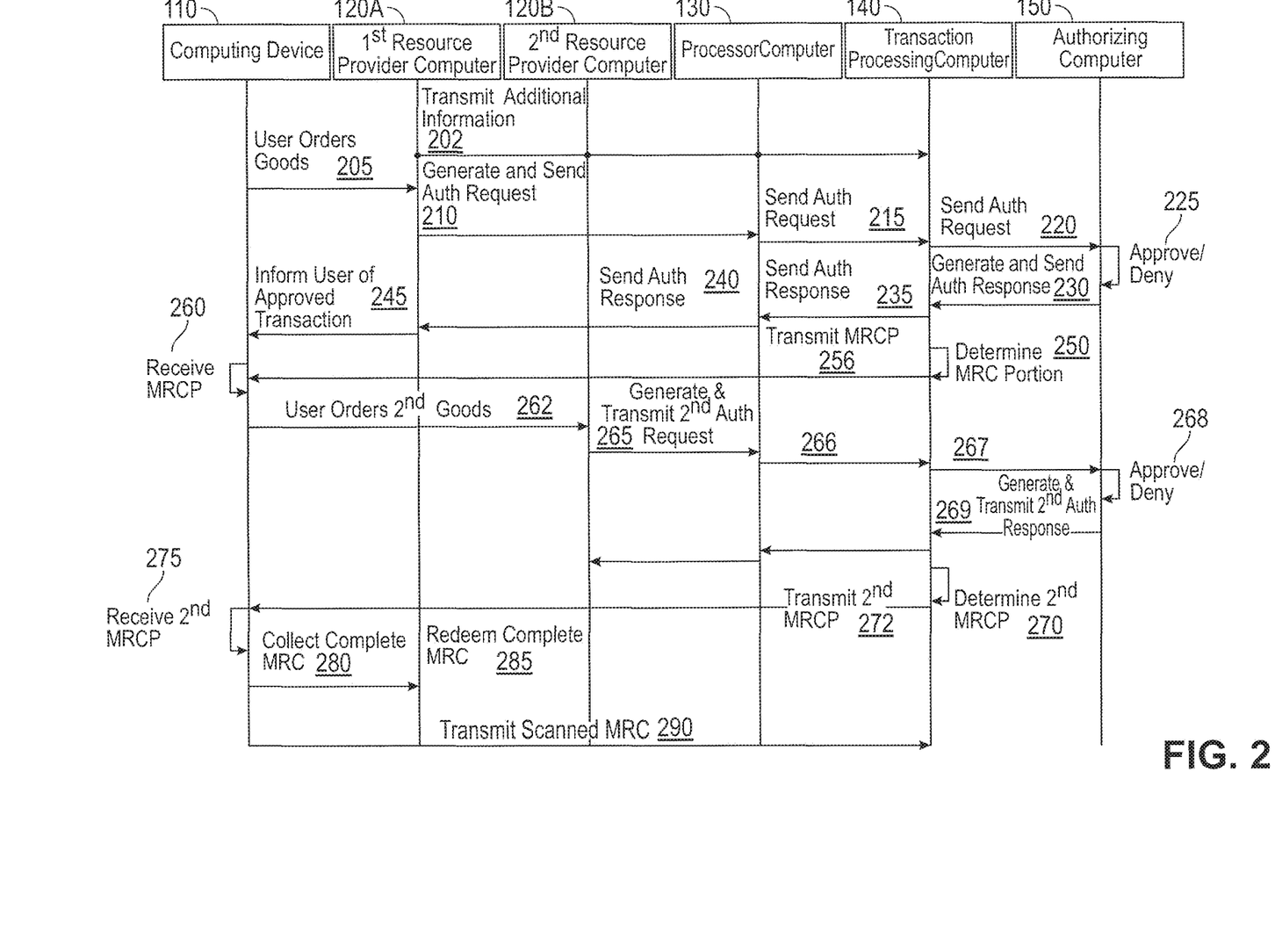
FIG. 2 shows a flowchart illustrating an embodiment of the disclosure.

The system 100 of FIG. 1 may implement one or more methods described throughout the description of FIG. 2. FIG. 2 shows a flowchart illustrating an embodiment of the disclosure.

First, one or more machine readable codes may be generated by the identifier module 144 (e.g., prior to conducting transactions with the transaction module 142, etc.) and a data processor. In step 202, one or more resource providers corresponding with one or more resource provider computers 120 (illustrated as a first resource provider computer 120A and second resource provider computer 120B in FIG. 2) may communicate with a transaction processing computer 140 to request the generation of a machine readable code and/or identifier that would form part of the machine readable code. The transaction processing computer 140 may receive information from the one or more resource provider computers 120 and store the information in a database location, accessible by the identifier. The identifier module 144 and an associated data processor may then encode the identifier into a machine readable code. In some examples, the identifier may be encrypted by a suitable encryption key prior to creating the machine readable code.

The information stored in the database and accessible by the identifier may include resource provider information, additional information that is provided to a computing device 110 in response to earning a complete machine readable code (discussed herein), or the machine readable code itself. In a sample illustration, the additional information may be an offer or discount on a current or future purchase. The machine readable code and additional information associated with the machine readable code may be stored in the transaction processing computer 140.

As another sample illustration, the additional information may comprise unique offer information for one or more users. In some examples, the identifier may be unique for a particular user or computing device 110. When the identifier is generated by the transaction processing computer 140, the identifier may correspond with a location in the database where offer details may be stored. The offer details (e.g., additional information in this illustration) may be provided to the computing device 110 or the resource provider computer 120 in response to the computing device 110 or the resource provider computer 120 transmitting the identifier to the transaction processing computer 140. As noted above, in some embodiments, the machine readable code may encode an encrypted identifier.

Multiple machine readable codes and identifiers may be generated for each resource provider. For example, a first identifier may correspond with an offer that is received when the user orders five items within the month of February. A second identifier may correspond with an offer that is received when the user makes a purchase of fifty dollars in a single transaction. In another example, a third identifier may correspond with an offer that is received when the user orders items using a particular computing device or account. In some embodiments, the machine readable codes associated with these identifiers may be redeemable at the resource provider computer 120, but may be maintained by the transaction processing computer 140.

At step 205, a user operating a computing device 110 may order one or more items (e.g., goods or services, etc.) from a first resource provider computer 120A. For example, the computing device 110 may communicate with the resource provider computer 120A through a website associated with a resource provider that offers the items. Each of the offered items may be associated with an amount. The user operating the computing device 110 may provide an account identifier or payment token (e.g., a substitute for a real account identifier) to the resource provider computer 120 when ordering the items. In some examples, a digital wallet application may be implemented to associate the account identifier of the user to the order of the items and to initiate a transaction for the items. In such embodiments, the user need not provide the account identifier to the resource provider computer 120 directly.

In some examples, the computing device 110 may download an access application by communicating with the resource provider computer 120 and/or the authorizing computer 160 via the communications network 160. The access application may allow computing device 110 to interact with an access device or resource provider computer 120 to obtain an item associated with the resource provider and/or initiate a transaction with the authorizing computer 150. For example, in some embodiments, the access application on the computing device 110 may receive a resource provider identifier, generate an authorization request message with the resource provider identifier, and transmit the authorization request message to the processor computer 130 on behalf of the resource provider computer 120. In some embodiments, the access application can be downloaded from an application store associated with authorizing computer 150 or the resource provider 120.

Returning to FIG. 2, in step 210, the first resource provider computer 120A may generate an authorization request message to initiate a transaction using the account identifier from the computing device 110 or wallet application, each of which may be associated with the user. The first resource provider computer 120A may transmit the authorization request message to the processor computer 130. The authorization request message may comprise a transaction amount (e.g., an aggregated amount associated with each of the one or more items ordered by the user, etc.), a resource provider identifier, a resource provider location, an account identifier, etc.

At step 215, the processor computer 130 may transmit the authorization request message to the transaction processing computer 140. At step 220, the transaction processing computer 140 may determine an authorizing computer from the account identifier in the authorization request message and transmit or forward the authorization request message to the authorizing computer 150.

At step 225, the authorizing computer 150 may authenticate and/or authorize the user of the computing device 110. For example, authorizing computer 150 may receive the authorization request message and determine an authorization result. Authorizing computer 150 may determine the authorization result by, for example, comparing the transaction amount to data relating to the account identifier, such as a remaining balance associated with the account identifier identified in the authorization request message. Authorizing computer 150 may generate an authorization response message and populate the authorization response message with the authorization result in an authorization response message.

At step 230, authorizing computer 150 may send the authorization response message to transaction processing computer 140. The transaction processing computer 140 may receive the authorization response message from the authorizing computer 150 and/or may determine a machine readable code portion of a machine readable code (as discussed with step 250).

At step 235, transaction processing computer 140 may then send the authorization response message to processor computer 130, which may forward the authorization response message to first resource provider computer 120A at step 240. The authorization response message may comprise an indication of whether the transaction is approved or denied.

At step 245, first resource provider computer 120A may communicate the determined action to computing device 110. For example, first resource provider computer 120A may receive an authorization result of "decline—insufficient funds" and may prompt computing device 110 to present an alternate form of payment. In another example, the first resource provider computer 120A may receive an authorization result of "approve" and may initiate a process to provide the user operating the computing device 110 with the item (e.g., shipping the item from the resource provider to the user in an e-commerce transaction, or handing the item to the user in an face-to-face transaction, etc.).

If the transaction is approved, a clearing and settlement process between the processor computer 130, transaction processing computer 140, and the authorizing computer 150 may be performed.

At step 250, either during or after the above steps have been performed, the transaction module 142 at the transaction processing computer 140, in conjunction with a data processor, may determine the transaction amount corresponding to an authorized transaction from the authorization response message (received at step 230). The identifier module 144 may, in conjunction with a data processor, determine an identifier and/or generate a machine readable code or code portion including the identifier, which corresponds with the entities involved in the transaction (e.g., the user operating the computing device 110 and the first resource provider computer 120A). For example, the transaction processing computer 140 may determine a previously generated machine readable code associated with the resource provider computer 120 and also determine whether the computing device 110 associated with the transaction has previously received a machine readable code portion associated with the resource provider computer 120.

The transaction processing computer 140 may determine a machine readable code portion of a complete machine readable code based upon the transaction. For example, the transaction processing computer 140 may determine a percentage of the complete machine readable code based on the value of the transaction or the number of times that the user of the computing device 110 has interacted with the resource provider computer 140. Either value may correspond with a minimum requirement that the user needs to meet in order to receive one or more portions of the complete machine readable code.

As a sample illustration, the user may complete three transactions with the resource provider. The resource provider may set a threshold of three transactions before it will allow the user to receive the complete machine readable code (e.g., either as a whole code or in portions in response to multiple transactions). As another sample illustration, the user may pay ten dollars in a transaction. The resource provider may set a threshold of eleven dollars before a complete machine readable code is provided to the computing device of the user, which may cause the user to receive only a portion of the complete machine readable code since the threshold of eleven dollars has not been met by the transaction.

In some embodiments, the total amount of each transaction may be represented as a percentage of the total value required by the resource provider to provide all machine readable code portions forming a complete machine readable code. The percentage may be translated as a physical size or scaling factor of the machine readable code portion. For example, when the total value of the machine readable code corresponds to a value of one hundred dollars, and the transaction amount is thirty dollars, the percentage of the transaction amount to the total value required is thirty percent. The transaction processing computer 140 may determine a size of the machine readable code portion also as thirty percent of the complete machine readable code. The transaction processing computer 140 may determine that thirty percent of the complete machine readable code should be provided as a machine readable code portion to the computing device 110 in response to conducting the transaction.

The transaction processing computer 140 may determine which portion of the machine readable code to provide to the computing device 110 (e.g., corresponding with x-y coordinates, etc.). The location of the machine readable code portion within the complete machine readable code may be identified and encoded by a second machine readable code. This second machine readable code may encode a relative location of the machine readable code portion within the complete machine readable code. Both the machine readable code portion and the second machine readable code may be associated with a single transaction and may be transmitted to the computing device 110.

At step 256, transaction processing computer 140 may transmit data representing the machine readable code portion to the computing device 110 associated with the transaction. In some embodiments, instead of transmitting the machine readable code portion to the computing device 110, transaction processing computer 140 may transmit data representing the machine readable code portion to an access device associated with the first resource provider computer 120A.

At step 260, the computing device 110 or an access device (not shown) associated with the first resource provider computer 120A may receive, display, and/or store the received machine readable code portion. In some examples, the computing device 110 or an access device (not shown) associated with the first resource provider computer 120A may display the machine readable code portion according to the location identified in the second machine readable code. Additional details regarding the display of the machine readable code portion are provided with FIG. 3.

At step 262, the user operating computing device 110 may order second items (e.g., goods or services, etc.) from a second resource provider computer 120B. The user operating the computing device 110 may provide the account identifier or token to the second resource provider computer 120B when ordering the items. In some examples, a wallet application may be implemented to associate the account identifier of the user to the order of the items and to initiate a second transaction for the second items.

At step 265, a second transaction may be initiated. Although FIG. 2 illustrates the second transaction between the computing device 110 and the second resource provider computer 120B, the second transaction may be initiated between the computing device 110 and first resource provider computer 120A or between the computing device 110 and second resource provider computer 120B. Either resource provider computer 120A, 120B may generate a second authorization request message to initiate a second transaction once the items are ordered by the computing device 110.

At steps 266-269, the second authorization request message may follow a similar process flow as the first authorization request message (e.g., from the resource provider to the processor computer 130, to the transaction processing computer 140, to the authorizing computer 150, and back). This may include the transaction processing computer 140 receiving the second authorization request message comprising the account identifier associated with the user, determining the authorizing computer 150 from the account identifier in the second authorization request message, and forwarding the second authorization request message to the authorizing computer 150, wherein the authorizing computer generates a second authorization response message. The transaction processing computer 140 may receive the second authorization response message from the authorizing computer 150 and determine a second machine readable code portion of the machine readable code based upon the second transaction.

For example, in some embodiments, the second transaction may be initiated between the computing device 110 and first resource provider computer 120A. In this instance, the first machine readable code portion and the second machine readable code portion may be associated with the first resource provider computer 120A. These two machine readable code portions may be combined to form a single, complete machine readable code. The additional information that corresponds with the complete machine readable code may include the resource provider identifier associated with the first resource provider computer 120A and/or offer information corresponding with one or more items available for ordering with the first resource provider computer 120A by the computing device 110.

In another example, the second transaction may be initiated between the computing device 110 and second resource provider computer 120B (e.g., an example of a generic machine readable code, etc.). In this instance, the first machine readable code portion may be associated with the first resource provider computer 120A and the second readable code portion may be associated with the second resource provider computer 120B. These two machine readable code portions may be combined to form a single, complete machine readable code at the computing device 110. The additional information that corresponds with the complete machine readable code may include both of the resource provider identifiers and/or offer information corresponding with one or more items available for ordering at both of the resource providers. Additional examples and processes associated with a generic machine readable code are described with FIG. 3.

At step 270, transaction processing computer 140 may determine a second machine readable code portion using a similar process as the generation of the first machine readable code portion. For example, the transaction module 142 at the transaction processing computer 140 may determine the transaction amount corresponding to the second authorized transaction from the authorization response message. The identifier module 144, in conjunction with a data processor, may determine a machine readable code and/or identifier that corresponds with the entities involved in the second transaction (e.g., the user operating the computing device 110 and the second resource provider computer 120B). The identifier module 144, in conjunction with a data processor, may then determine a second machine readable code portion based at least in part on the stored machine readable code. The size and/or configuration of the second machine readable code portion may be determined with an appropriate size or scaling factor, as well as a location of the machine readable code portion within the complete machine readable code.

At step 272, the transaction processing computer 140 may transmit the second machine readable code portion to the computing device 110 associated with the second transaction.

At step 275, the computing device 110 may receive, display, and/or store the second machine readable code portion, along with other machine readable code portions of the complete machine readable code. The one or more machine readable codes may be displayed so that, when combined, they form a complete machine readable code. The machine readable code portions may be displayed according to the location corresponding with each machine readable code portion (e.g., identified in the second machine readable code, etc.). An example of this display is provided with FIG. 3.

At step 280, computing device 110 may generate the complete machine readable code after receiving all of the machine readable code portions needed to complete it.

At step 285, the complete machine readable code may be provided from the computing device 110 to the first resource provider computer 120A. For example, the computing device 110 may provide the complete machine readable code to an access device and/or the first resource provider computer 120A operated by a particular resource provider to receive additional information from the resource provider. In another example, the computing device 110 may activate a tool at the website of the resource provider to provide the complete machine readable code (e.g., an activation button, etc.). The additional information may include an offer for an item, loyalty information, and the like.

In some examples, the machine readable code can be scanned using a scanning device, which may be present in the computing device 110 or the resource provider computers. Further, in some embodiments, the resource provider computers may assemble the complete machine readable code from the machine readable code portions, instead of the computing device 110. For example, an access device and/or resource provider computer 120 can display the complete machine readable code after it collects all of the machine readable code portions. A scanning device in the computing device 110 operated by the user can scan the machine readable code (e.g., using a camera incorporated with the computing device 110, etc.).

At step 290, the computing device 110 may transmit the scanned machine readable code to the transaction processing computer 140 via a communications network 160. The transaction processing computer 140 may decode the machine readable code to determine the identifier encoded by the machine readable code. In some examples, the identifier may be an encrypted alphanumeric code, which the transaction processing computer 140 may decrypt, using an appropriate decryption key, to determine the identifier. The transaction processing computer 140 may compare the received identifier with identifiers that are stored in the database. When a match is determined, the transaction processing computer 140 can identify the previously stored additional information and provide it to the computing device 110.

In some examples, the transaction processing computer 140 may perform a security process associated with one or more transmitted machine readable code portions. For example, a first computing device can transmit a machine readable code portion to a second computing device. The second computing device may transmit the machine readable code portion to the transaction processing computer 140 to confirm that the machine readable code portion is associated with an account of the user operating the second computing device. The transaction processing computer 140 may initiate a security process associated with the transmitted machine readable code portion to the first computing device and the received machine readable code portion from the second computing device (e.g., confirming that the machine readable code portion was not fraudulently obtained or stolen).

In some examples, a computing device that displays the complete machine readable code may be enabled to print information associated with the machine readable code. For example, an access device and/or resource provider computer 120 can display the complete machine readable code after it collects all of the machine readable code portions and the scanning device in the computing device 110 operated by the user can scan the machine readable code. The computing device 110 may transmit the scanned machine readable code to the transaction processing computer 140 via a communications network 160. The transaction processing computer 140 may decode the machine readable code to determine the identifier encoded by the machine readable code. The transaction processing computer 140 can identify the previously stored additional information and, rather than providing the information to the computing device 110, the transaction processing computer 140 can transmit an instruction to an access device associated with the first resource provider computer 120A or the second resource provider computer 120B to print the information for the user. The instruction to print information may correspond with an interval of time when the second transaction is being conducted, so that the user can receive the printed information from the access device.

Figure 3:
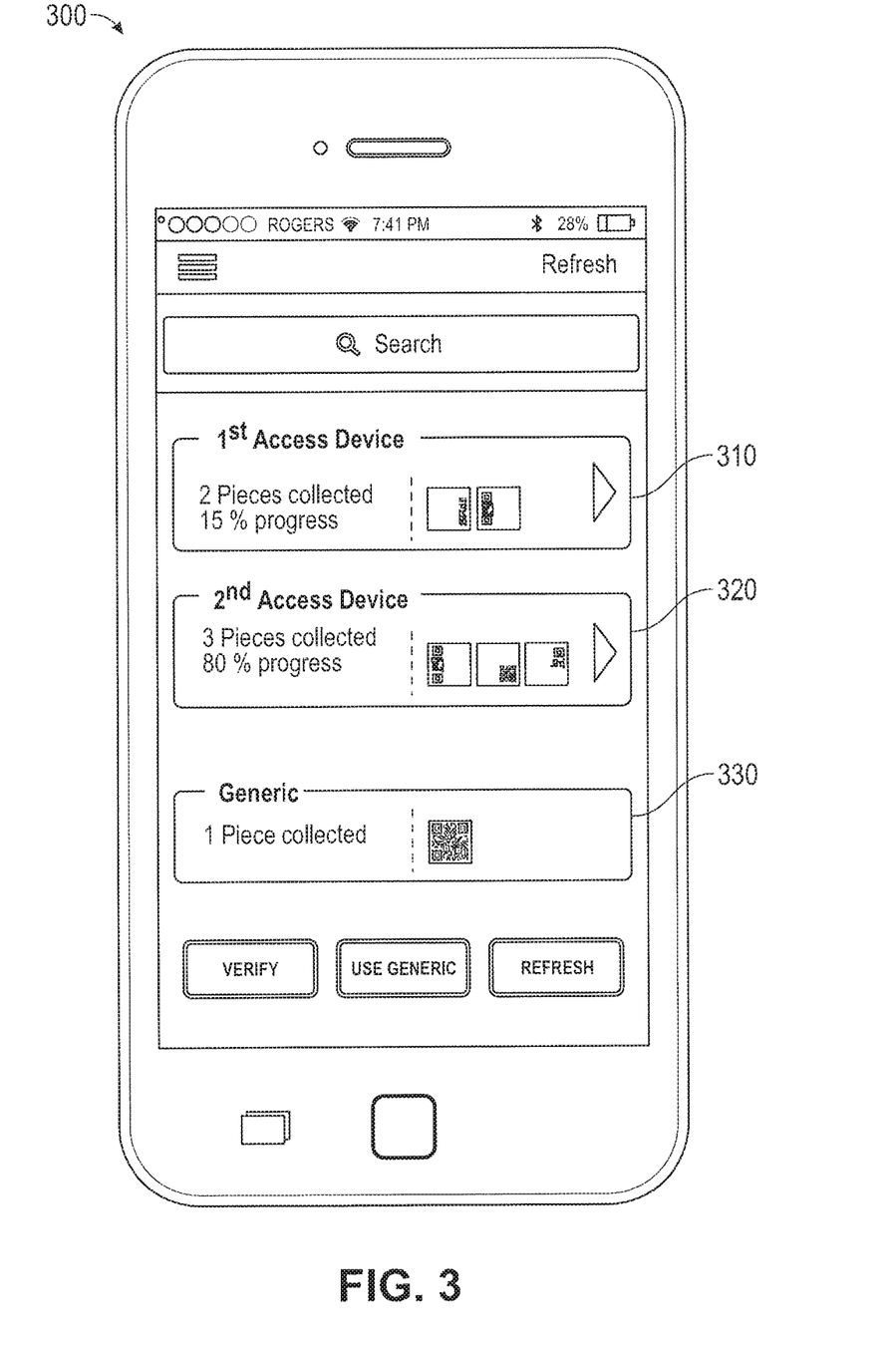
FIG. 3 illustrates a computing device displaying a plurality of machine readable code portions, according to an embodiment of the disclosure.

FIG. 3 illustrates a computing device displaying a plurality of machine readable code portions, according to an embodiment of the disclosure. As illustrated, the computing device 300 displays two machine readable code portions 310 associated with a first resource provider computer and three machine readable code portions 320 associated with a second resource provider computer. In some examples, first and second machine readable code portions may be displayed on the computing device 300 at the same time. The first and second machine readable code portions may correspond with part of the complete machine readable code (e.g., but not the entire machine readable code). The computing device 300 may be similar to the computing device 110 illustrated in FIGS. 1 and 2.

In some examples, the complete machine readable code may be provided to an access device of the resource provider computer to receive additional information from the resource provider. The complete machine readable code may be scanned by a scanning device. In some examples, the complete machine readable code may be displayed by the access device and scanned by the computing device 300. The scanned complete machine readable code may be transmitted to the transaction processing computer 140 for additional processing.

A generic machine readable code 330 may also be received and displayed by computing device 300. In some embodiments, the computing device 300 may perform a transaction that satisfies requirements of either the first resource provider computer or the second resource provider computer. For example, the transaction may comprise using a particular payment method associated with the first resource provider computer to order an item at the second resource provider computer. As a sample illustration, a user may use an Acme Co. debit card to order a coffee at Beta Brand. The authorization request message for this coffee purchase may be transmitted from the second resource provider computer 120B to a processor computer 130, then a transaction processing computer 140, and the authorizing computer 150 for approval.

After the transaction is approved by the authorizing computer 150, the transaction processing computer 140 may generate and transmit a generic machine readable code portion to the computing device 300. Both first and second resource provider computers 120A, 120B may have interacted with the user and the generic machine readable code portion may be associated with both first and second resource provider computers 120A, 120B. The generic machine readable code portion may be generated based upon activity at the first and second resource provider computers 120A, 120B, and/or could be redeemable with the first and second resource provider computers 120A, 120B.

In some embodiments, the user may assign a particular resource provider to the generic machine readable code portion. For example, once the generic machine readable code is received by the computing device 300, the user may select a resource provider to correlate with the generic machine readable code, via the display at the computing device 300. Once the resource provider is selected, the computing device 300 may generate and transmit a confirmation message to the transaction processing computer 140 to identify which resource provider the user has selected to use with the generic machine readable code.

In some embodiments, the generic machine readable code may correspond with a different size or scaling factor for each resource provider. For example, a transaction corresponding with a transaction amount of thirty dollars may comprise thirty percent of a total value associated with a complete machine readable code for a first resource provider. However, the same transaction amount of thirty dollars may only comprise fifteen percent of a total value associated with a complete machine readable code for a second resource provider. This may be due to difference in the total values associated with a complete machine readable code by the first and second resource providers.

In some embodiments, the computing device 300 may generate and transmit a confirmation to the transaction processing computer 140. The confirmation message transmitted by the computing device 300 may comprise a resource provider identifier corresponding with the selected resource provider, an account identifier, a value associated with the generic machine readable code, or any other identifying information. The transaction processing computer 140 may then determine the complete machine readable code associated with the selected resource provider and user. The transaction processing computer 140 can also determine the value associated with the generic machine readable code and/or the value of the existing machine readable code that has not yet been completed between the resource provider and user.

As a sample illustration, the user may have previously obtained fifty percent of a complete machine readable code before a generic machine readable code portion is received. The generic machine readable code portion can correspond with the other fifty percent of the complete machine readable code. Once the value of the generic machine readable code portion is identified, the transaction processing computer 140 may identify that corresponding portion of the complete machine readable code as being satisfied with the receipt of the generic machine readable code. The transaction processing computer 140 may transmit a second confirmation message to the computing device 300 (e.g., to confirm that the complete machine readable code has been completed by providing the generic machine readable code portion) and/or the additional information associated with the complete machine readable code.

In some examples, the computing device 300 may request to exchange a complete machine readable code for the additional information. For example, the computing device 300 may scan the complete machine readable code and/or transmit it to the transaction processing computer 140. The transaction processing computer 140 can decode the machine readable code to determine the identifier and/or the additional information associated with the identifier.

Figure 4:
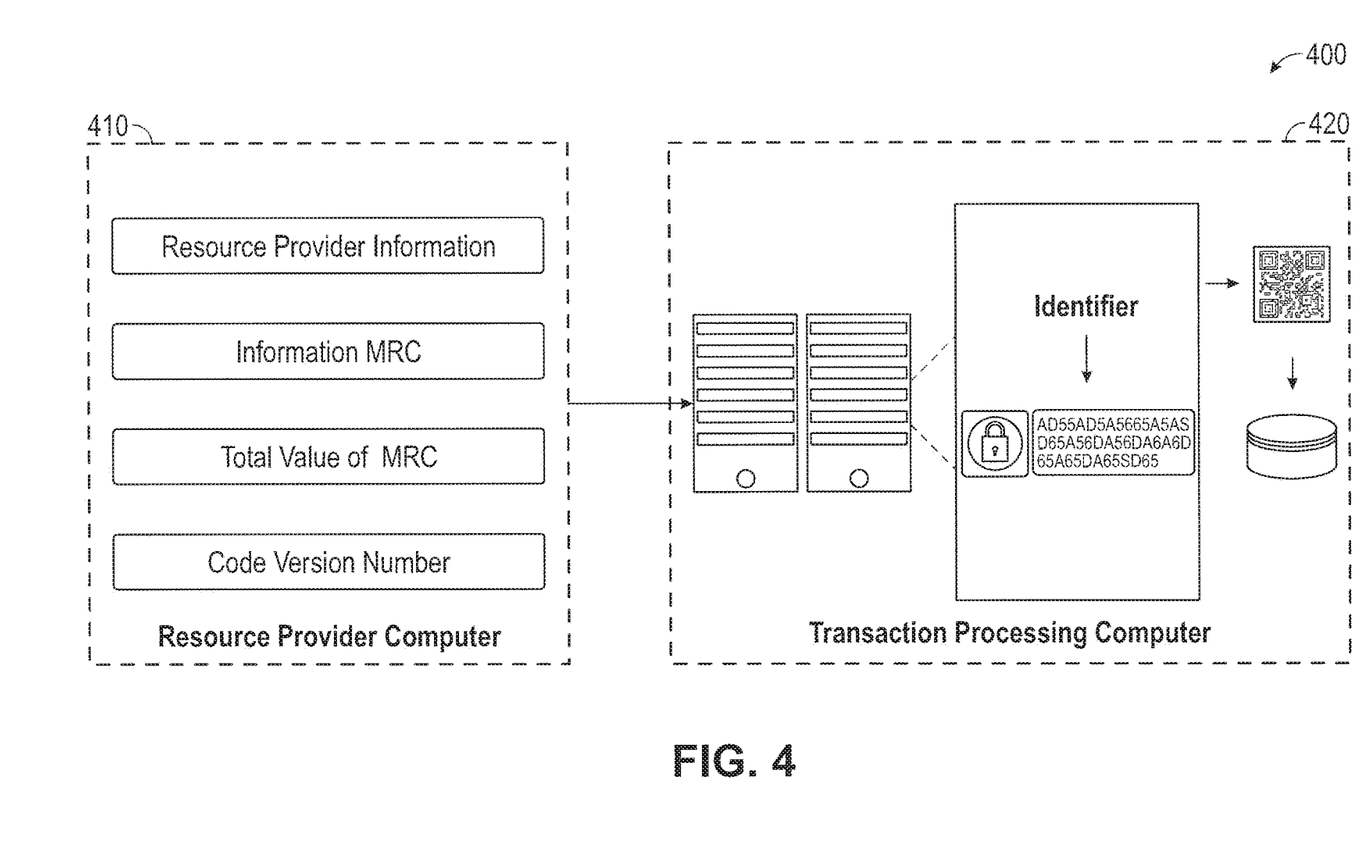
FIG. 4 illustrates generating a machine readable code, according to an embodiment of the disclosure.

FIG. 4 illustrates generating a machine readable code, according to an embodiment of the disclosure. The system 400 may receive data from a resource provider computer 410 to generate the machine readable code prior to transactions that earn the machine readable code portions (e.g., the total amount of the transaction, the number of transactions that satisfy requirements set by the resource providers, etc.). The data may correspond with requirements that are to be met before one or more machine readable code portions may be transmitted to the computing device 110. For example, the data may comprise resource provider information, information about a machine readable code, a total value of the machine readable code, a machine readable code identifier, or other information. The data may be stored in a database at the transaction processing computer 420.

The transaction processing computer 420 may generate an identifier that corresponds with additional information in a data store. The identifier may include a combination of alphabetic and numeric characters. In some embodiments, the identifier may correspond with a code version number and/or offer details that correspond with a resource provider.

In some embodiments, the identifier may be encrypted using an encryption algorithm and/or a key for data confidentiality. This may be desirable as encrypting the identifier may prevent unauthorized users or applications from accessing data that corresponds with the identifier, either on the computing device 110 or while data are in transit over a communications network. The distribution of encryption keys for use in encrypting, decrypting, or otherwise accessing data may be controlled by transaction processing computer 420, an authorizing computer, or other suitable entity described herein. In some embodiments, the encrypted identifier may be encoded into a machine readable code and transmitted to computing device 110.

When the complete machine readable code is received from the computing device 110, the machine readable code may be decoded to identify the encrypted identifier, and the identifier may be decrypted by the transaction processing computer 420. The decrypted identifier may be compared with stored identifiers. When a match is determined by the transaction processing computer 420, the data stored in the database corresponding with the identifier may be retrieved as the additional information that corresponds with the resource provider and the complete machine readable code.

Figure 5:
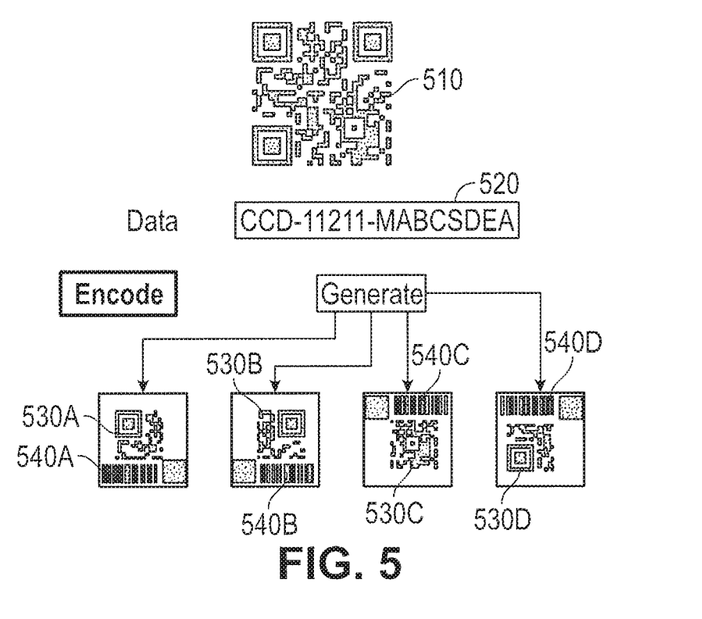
FIG. 5 illustrates generating machine readable code portions, according to an embodiment of the disclosure.

FIG. 5 illustrates generating machine readable code portions, according to an embodiment of the disclosure. The system (e.g., a transaction processing computer 140, a server computer, etc.) may determine and store the complete machine readable code 510 that encodes an identifier 520. The identifier may correspond with the additional information that is stored with the database.

The system may generate one or more machine readable code portions 530, illustrated as a first machine readable code portion 530A, a second machine readable code portion 530B, a third machine readable code portion 530C, and a fourth machine readable code portion 530D. More or fewer machine readable code portions may be generated, as described herein.

The system may also generate one or more second machine readable codes 540A-D associated with first, second, third, and fourth machine readable code portions 530A-D. The second machine readable codes 540A-D may encode or define a location or relative position of the machine readable code portion within the complete machine readable code (e.g., upper left corner of a square representing the machine readable code, the center of the code, x-y coordinates that define the boundaries of the code along an axis, etc.).

A first machine readable code portion 530A and second machine readable code 540A may be transmitted in response to receiving data corresponding to a transaction. In this example, the transaction amount may correspond with twenty-five percent of a total value associated with the machine readable code 510. Four total transactions may be conducted, each worth twenty-five percent of the total value of the machine readable code. The transaction processing computer 140 may transmit the machine readable code portion 530A and the second machine readable code 540A in one data transmission in response to one transaction. It may then transmit the second machine readable code portion 530B and another second machine readable code 540B in response to the second transaction, and so on. When the computing device 110 receives all four machine readable code portions 530A-D and second machine readable codes 540A-D, the computing device 110 may assemble the machine readable code portions together to form the complete machine readable code.

Figure 6:
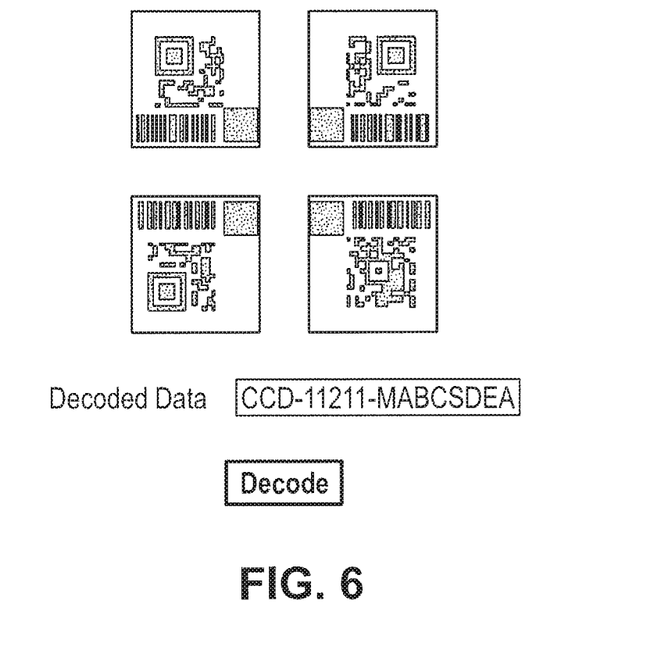
FIG. 6 illustrates decoding machine readable code portions, according to an embodiment of the disclosure.

FIG. 6 illustrates decoding machine readable code portions, according to an embodiment of the disclosure. In some embodiments, the transaction processing computer 140 or another computer may receive the machine readable code portions 530A-D and the second machine readable codes 540A-D, either in an assembled format or as separate elements. The transaction processing computer 140 may decode the complete machine readable code to determine the identifier. If it is encrypted, the identifier may be decrypted. Once decrypted, the transaction processing computer 140 may perform additional processing on behalf of the user that sent code portions 530A-D or the complete machine readable code formed by the code portions 530A-D. For example, the user may receive a discount, a coupon or a statement credit on their account after providing the complete machine readable code. Alternatively, in a non-payment context, a user may be able to access a particular location after obtaining all code portions forming the complete machine readable code.

The software components or functions described in this application, may be implemented as software code to be executed by one or more processors using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may also reside on or within a single computational apparatus, and may be present on or within different computational apparatuses within a system or network.

Some embodiments of the present disclosure can be implemented in the form of control logic in software or hardware or a combination of both. The control logic may be stored in an information storage medium as a plurality of instructions adapted to direct an information processing device to perform a set of steps disclosed in an embodiment of the present disclosure. Based on the disclosure and teachings provided herein, a person of ordinary skill in the art will appreciate other ways and/or methods to implement the present disclosure.

Any recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method comprising:
   receiving, by a machine readable code transmitter employing a server computer, an authorization request message comprising an account identifier, wherein the account identifier is associated with a user,
   wherein the server computer is determined by a processor computer from information included with the authorization request message, and the processor computer received the authorization request message from an access device in a transaction;

determining, by the machine readable code transmitter employing the server computer, a machine readable code portion of a machine readable code based upon the transaction and after determining that the transaction is authorized; and transmitting, by the machine readable code transmitter employing the server computer, data representing the machine readable code portion to a communication device, wherein the communication device thereafter displays the machine readable code portion.

2. The method of claim 1, wherein the machine readable code portion is a first machine readable code portion, the authorization request message is a first authorization request message, and the transaction is a first transaction, and wherein the method further comprises:

receiving, by the machine readable code transmitter employing the server computer, a second authorization request message comprising the account identifier in a second transaction, the account identifier associated with the user;

determining, by the machine readable code transmitter employing the server computer, a second machine readable code portion of the machine readable code based upon the second transaction; and transmitting, by the machine readable code transmitter employing the server computer, data representing the second machine readable code portion to the communication device, wherein the communication device thereafter displays the second machine readable code portion.

3. The method of claim 2, wherein the first and second machine readable code portions are displayed on the communication device at a same time, the first and second machine readable code portions for part of the, but not an entire, machine readable code.

4. The method of claim 1, wherein the communication device is a mobile device operated by the user.

5. The method of claim 1, wherein the communication device is the access device.

6. The method of claim 1, wherein a scaling factor of the machine readable code portion corresponds with information of the machine readable code, the account identifier of the user, or the transaction.

7. The method of claim 1, wherein the determining the machine readable code portion of the machine readable code is based on an amount of the transaction.

8. The method of claim 1, wherein the determining the machine readable code portion of the machine readable code is based on a number of times other machine readable code portions are received from the access device.

9. The method of claim 1, wherein upon completion of the machine readable code using the machine readable code portion, the communication device is enabled to print information associated with the machine readable code.

10. The method of claim 1, wherein the communication device is a first communication device, and the method further comprises:

receiving the machine readable code portion from a second communication device, wherein the second communication device receives the machine readable code portion from the first communication device; and initiating, by the machine readable code transmitter employing the server computer, a security process associated with the transmitted machine readable code portion to the first communication device and the received machine readable code portion from the second communication device.

11. A machine readable code transmitter employing a server computer comprising:

a processor; and a computer readable medium coupled to the processor, wherein the computer readable medium comprises code executable by the processor for implementing a method comprising:

receiving an authorization request message comprising an account identifier, wherein the account identifier is associated with a user, wherein the server computer is determined by a processor computer from information included with the authorization request message, and the processor computer received the authorization request message from an access device in a transaction;

determining a machine readable code portion of a machine readable code based upon the transaction; and transmitting data representing the machine readable code portion to a communication device, wherein the communication device thereafter displays the machine readable code portion.

12. The machine readable code transmitter employing the server computer of claim 11, wherein the machine readable code portion is a first machine readable code portion, the authorization request message is a first authorization request message, and the transaction is a first transaction, and wherein the method further comprises:

determining a second machine readable code portion of the machine readable code based upon a second transaction; and transmitting data representing the second machine readable code portion to the communication device, wherein the communication device thereafter displays the second machine readable code portion.

13. The machine readable code transmitter employing the server computer of claim 12, wherein the first and second machine readable code portions are displayed on the communication device at a same time, the first and second machine readable code portions for part of the, but not an entire, machine readable code.

14. The machine readable code transmitter employing the server computer of claim 11, wherein the communication device is a mobile device operated by the user.

15. The machine readable code transmitter employing the server computer of claim 11, wherein the communication device is the access device.

16. The machine readable code transmitter employing the server computer of claim 11, wherein a scaling factor of the machine readable code portion corresponds with information of the machine readable code, the account identifier of the user, or the transaction.

17. The machine readable code transmitter employing the server computer of claim 11, wherein the determining the machine readable code portion of the machine readable code is based on an amount of the transaction.

18. The machine readable code transmitter employing the server computer of claim 11, wherein the determining the machine readable code portion of the machine readable code is based on a number of times other machine readable code portions are received from the access device.

19. A communication device comprising:

a processor; and a computer readable medium coupled to the processor, wherein the computer readable medium comprises code executable by the processor for implementing a method comprising:
  initiating a first transaction with an access device of a resource provider, thereby causing the access device to generate and transmit an authorization request message comprising an account identifier associated with a user operating the communication device, wherein the authorization request message is transmitted to a processor computer from the access device, and wherein the processor computer is determined by a server computer from information included with the authorization request message;
  receiving, from a machine readable code transmitter employing a server computer, a first machine readable code portion based upon the first transaction;
  receiving a second machine readable code portion associated with a second transaction; and
  displaying the first and second machine readable code portions at a same time, the first and second machine readable code portions form part of, but not an entire, machine readable code, and wherein the first and second machine readable code portions form at least part of a complete machine readable code for authorizing a third transaction.

20. The communication device of claim 19, wherein the method further comprises:
  generating the machine readable code with at least the first and second machine readable code portions; and
  providing the machine readable code to the access device of the resource provider to receive additional information from the resource provider.

* * * * *